United States Patent
Lee et al.

(10) Patent No.: US 9,451,063 B2
(45) Date of Patent: Sep. 20, 2016

(54) MOBILE TERMINAL

(71) Applicant: LG ELECTRONICS INC., Seoul (KR)

(72) Inventors: Seongcheol Lee, Seoul (KR); Jeongwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 14/080,639

(22) Filed: Nov. 14, 2013

(65) Prior Publication Data

US 2014/0135071 A1  May 15, 2014

(30) Foreign Application Priority Data

Nov. 15, 2012 (KR) .......................... 10-2012-0129719

(51) Int. Cl.
   *H04M 1/02* (2006.01)
   *H04M 1/22* (2006.01)

(52) U.S. Cl.
   CPC ............. *H04M 1/0266* (2013.01); *H04M 1/22* (2013.01)

(58) Field of Classification Search
   CPC ................... G02F 2201/503; G02F 1/133308; H04M 1/0266; H04M 1/22
   See application file for complete search history.

(56) References Cited

U.S. PATENT DOCUMENTS

| | | | | |
|---|---|---|---|---|
| 2005/0286264 A1* | 12/2005 | Kim | ................... | G02F 1/133603 362/600 |
| 2007/0012489 A1* | 1/2007 | Kim | ..................... | G06F 1/1624 178/18.01 |
| 2008/0024422 A1* | 1/2008 | Kim | ....................... | H05B 41/00 345/102 |
| 2008/0218661 A1* | 9/2008 | Tsai | ..................... | G02B 6/0083 349/65 |
| 2010/0128196 A1* | 5/2010 | Kim | .................. | G02F 1/133308 349/58 |
| 2010/0273530 A1* | 10/2010 | Jarvis | ..................... | F16F 1/027 455/566 |
| 2011/0187677 A1* | 8/2011 | Hotelling | .............. | G06F 3/0412 345/174 |
| 2012/0176325 A1* | 7/2012 | Okazaki | .................. | G06F 3/041 345/173 |
| 2014/0104246 A1* | 4/2014 | Rao | .......................... | G09G 5/00 345/204 |

* cited by examiner

*Primary Examiner* — Alexander Eisen
*Assistant Examiner* — Abhishek Sarma
(74) *Attorney, Agent, or Firm* — Birch, Stewart, Kolasch & Birch, LLP

(57) ABSTRACT

A mobile terminal having a terminal body and a display unit for outputting an image to a first surface of the terminal body is provided. The display unit includes a liquid crystal (LC) panel configured to form the image by receiving an electric signal, the LC panel being disposed to face the first surface of the terminal body, a driver integrated circuit (IC) configured to apply the electric signal to the LC panel, the driver IC being mounted to a first surface of the LC panel adjacent to a first edge of the LC panel and a light source portion configured to provide light to the LC panel, the light source portion being disposed close to a second edge of the LC panel opposite to the first edge.

18 Claims, 8 Drawing Sheets

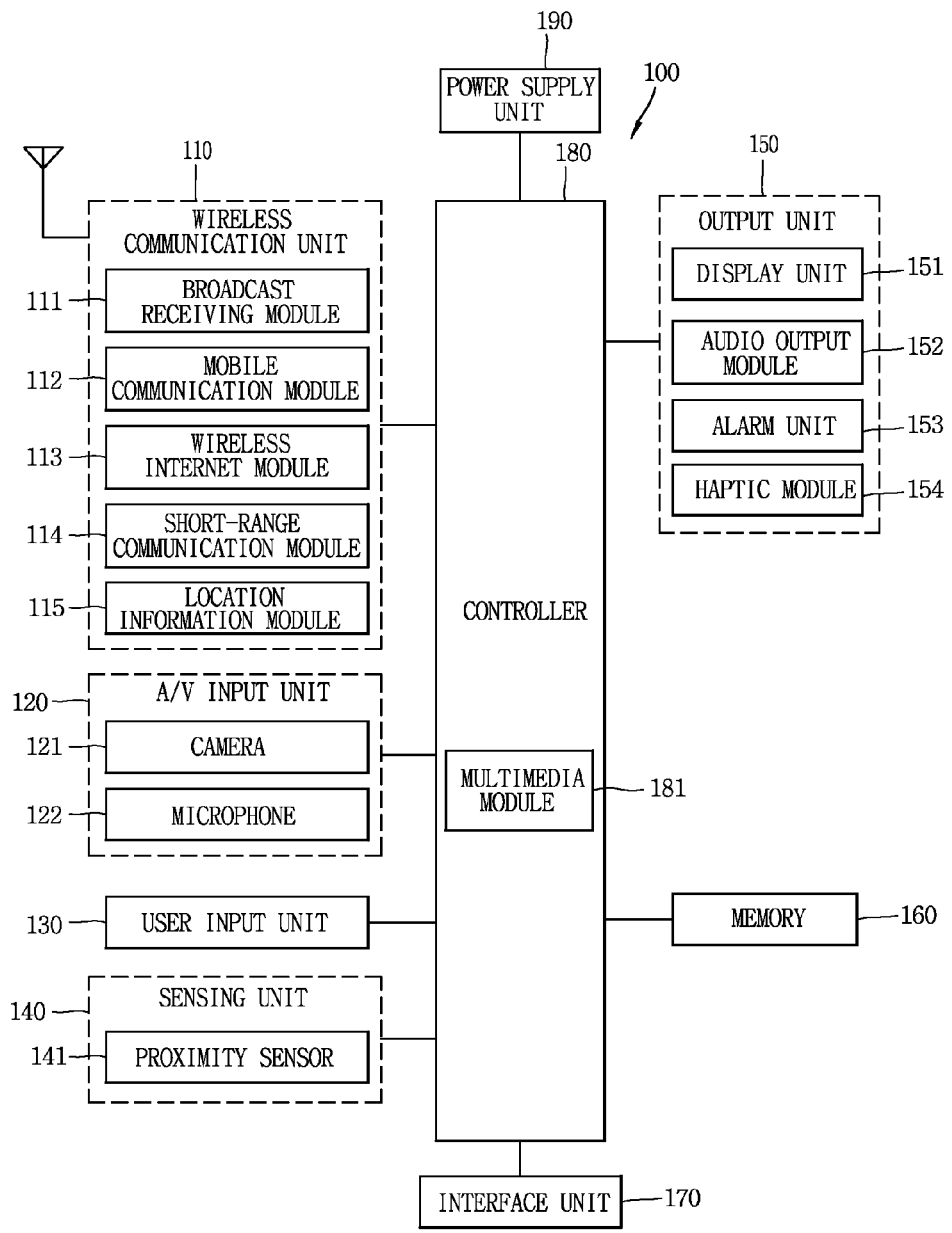

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0129719, filed on Nov. 15, 2012, the contents of which is incorporated by reference herein in its entirety.

BACKGROUND OF THE INVENTION

1. Field of the Invention

The present disclosure relates to a mobile terminal, and particularly, to a mobile terminal including a display unit.

2. Description of Related Art

A mobile terminal is a device that can be carried around and has one or more functions such as to perform voice and video call communications, inputting and outputting information, storing data, and the like.

Recently, as functions of the mobile terminal become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software. As the mobile terminal is regarded as a personal belonging for expressing a user's personality, various designs are required. Such designs include structural changes and improvements for enhancing the appearance of the mobile terminal.

As various types of electronic components are mounted to the mobile terminal, ongoing is research on a method of reducing the amount of heat generated from the electronic components. Further, research on decreasing an area of a bezel portion which is generally increased by the electronic components, is also actively ongoing.

BRIEF SUMMARY OF THE INVENTION

Therefore, an aspect of the detailed description is to provide a mobile terminal having a reduced bezel portion, and configured to disperse emitted heat.

To achieve these and other advantages and in accordance with the purpose of this specification, as embodied and broadly described herein, there is provided a mobile terminal having a display unit, comprising: a liquid crystal (LC) panel; a driver integrated circuit (driver IC); and a light source portion. The LC panel may form an image by receiving an electric signal, and may be disposed to face one surface of a terminal body. The driver IC may be configured to apply an electric signal to the LC panel, and may be mounted to another surface of the LC panel adjacent to a first edge of an existing LC panel. The light source portion may be configured to provide light to the LC panel, and may be disposed close to a second edge opposite to the first edge.

In an embodiment of the present invention, the mobile terminal may further comprise an input key partially overlapping the display unit, and configured to input signals when pressed.

In an embodiment of the present invention, the input key may be disposed close to the second edge.

In an embodiment of the present invention, the display unit may comprise: a light guiding portion disposed close to the light source portion, overlapping the LC panel, and configured to guide light to thus emit to the LC panel; a diffusion portion disposed between the light guiding portion and the LC panel, and configured to diffuse the light; and a mold portion configured to support edges of the light guiding portion and the diffusion portion. At least part of the mold portion may be formed below the input key, so as to support the input key.

In an embodiment of the present invention, the mobile terminal may further comprise: a main circuit board disposed in the terminal body, and having at least one electronic component mounted thereto; a first flexible printed circuit board (FPCB) configured to connect the driver IC and the main circuit board, and extending from the LC panel so as to enclose the first edge; and a second FPCB extending from the light source portion so as to enclose the second edge, and electrically connected to the main circuit board.

In an embodiment of the present invention, the mobile terminal may further comprise a third FPCB extending from the input key, and electrically connected to the circuit board. The third FPCB may be supported by the mold portion.

In an embodiment of the present invention, the input key may be disposed so as to be supported by one region of the light guiding portion.

In an embodiment of the present invention, the mobile terminal may further comprise a camera portion disposed on one surface of the terminal body so as to be close to the input key, and configured to capture an image.

In an embodiment of the present invention, the camera portion may include a camera module disposed close to the light source portion, partially overlapping the input key, and configured to support the input key.

In an embodiment of the present invention, the terminal body may include a front surface where the display unit is formed, a rear surface facing the front surface, and a side surface which connects the front surface and the rear surface with each other. The camera portion may be mounted to the front surface or the side surface.

In an embodiment of the present invention, the camera module may include a camera lens formed towards the side surface of the terminal body.

In an embodiment of the present invention, if the camera module is mounted to the front surface, the mobile terminal may further comprise a camera hole configured to pass therethrough light incident to the camera module from the outside; and a reflection portion configured to reflect the light passing through the camera hole to the camera lens.

In an embodiment of the present invention, the mobile terminal may further comprise an input key partially overlapping the camera module so as to be supported by the camera module, and configured to input signals when pressed.

In an embodiment of the present invention, the mobile terminal may further comprise a frame disposed in the mobile terminal, and configured to support the display unit; and first and second openings through which the first and second FPCBs pass.

In an embodiment of the present invention, the mobile terminal may further comprise a supporting portion bent after protruding from the frame, and configured to support a lower part of the input key.

In an embodiment of the present invention, the mold portion may be disposed between the frame and the supporting portion.

In an embodiment of the present invention, the mobile terminal may further comprise a third FPCB extending from the input key, electrically connected to the circuit board, and supported by the supporting portion. A third opening through which the third FPCB passes may be formed at the frame, so that the FPCB can be connected to the main circuit board.

In an embodiment of the present invention, the input key may be disposed close to the second edge.

To achieve these and other advantages and in accordance with the purpose of this specification, as embodied and broadly described herein, there is also provided a mobile terminal having a display unit for outputting an image to one surface of a terminal body, wherein the display unit comprises: a liquid crystal (LC) panel configured to form an image by receiving an electric signal, and disposed to face one surface of the terminal body; a backlight unit disposed below the LC panel, and configured to provide light to the LC panel; and a mold portion configured to support the edge of the backlight unit. The mobile terminal may further comprise an input key disposed above the mold portion, supported by the mold portion, and configured to input signals when pressed.

In an embodiment of the present invention, the mobile terminal may further comprise a driver integrated circuit (IC) configured to transmit and receive signals to/from the LC panel, and disposed at one end of the LC panel spaced from the input key. The backlight unit may further include a light source portion disposed at another end of the LC panel.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings:

FIG. 1 is a block diagram of a mobile terminal according to an embodiment of the present invention;

DETAILED DESCRIPTION OF THE INVENTION

Figure 2A:
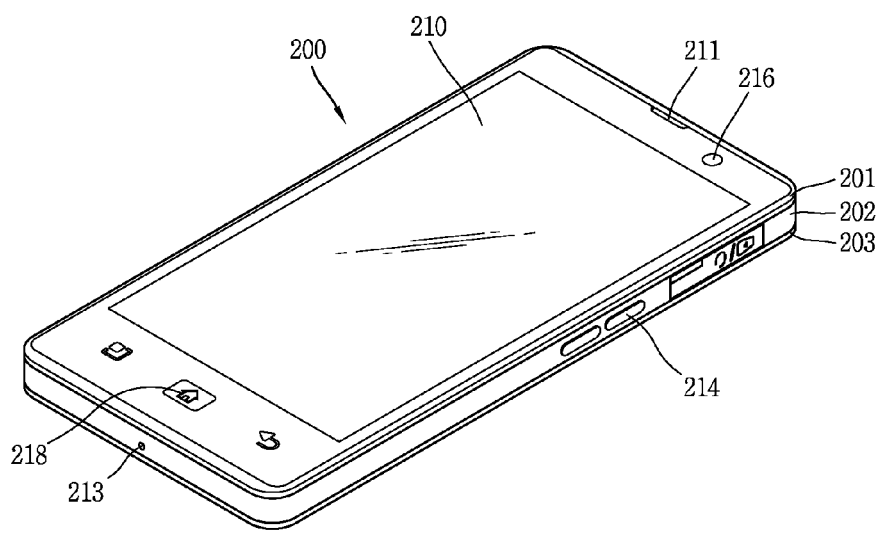
FIG. 2A is a front perspective view of a mobile terminal according to an embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated. Singular expressions include plural expressions which do not have any obviously different meaning in view of a context.

A terminal in the present description may include a mobile terminal such as a portable phone, a smart phone, a notebook computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer, except for specific configurations for mobility.

The mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted), a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or a capturing mode, the display 151 may display a captured and/or received image or a GUI or a UI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. A rear side of the display 151 may be formed to be transmissive. Under such configuration, a user can view an object positioned at the rear side of the terminal body, through a region occupied by the display 151 of the terminal body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the for of vibration. Such video signal or audio signal may be output through the display 151 or the audio output module 152. Accordingly, the display 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or atm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of the individual attempting to use the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2B:
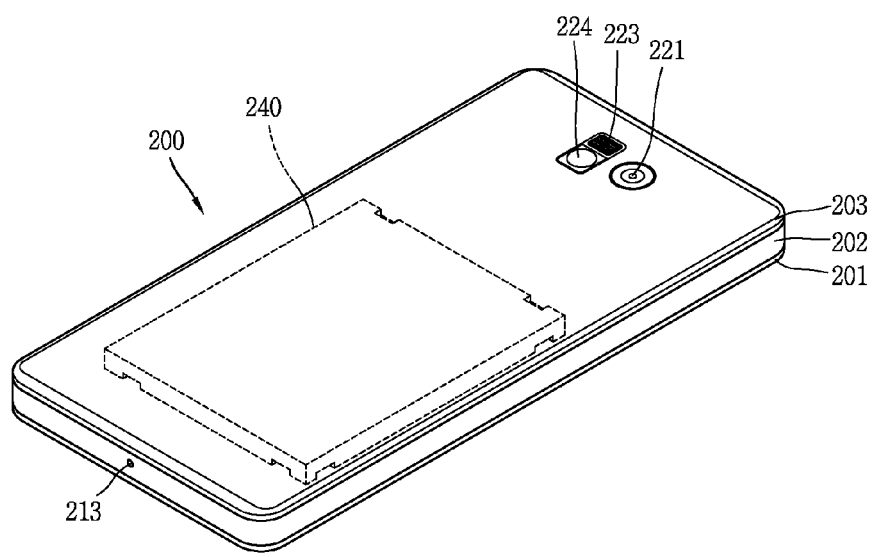
FIG. 2B is a rear perspective view of the mobile terminal shown in FIG. 2A.

FIG. 2A is a front perspective view of the mobile terminal according to an embodiment of the present invention, and FIG. 2B is a rear perspective view of the mobile terminal of FIG. 2A.

Referring to FIGS. 2A and 2B, the mobile terminal 200 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like. Further, the mobile terminal of the present invention may be also applicable to any portable electronic device having a camera and a flash, e.g., a portable phone, a smart phone, a notebook computer, a digital broadcasting terminal, Personal Digital Assistants (PDAs), Portable Multimedia Players (PMPs), etc.

A case (casing, housing, cover, etc.) which forms the appearance of a body may include a front case 201, a rear case 202 covering an opposite surface to the front case 201, and a cover 203 which covers a battery 240 provided on the rear surface of the mobile terminal. A space formed by the front case 201 and the rear case 202 may accommodate various components therein. Such cases may be formed by injection-molded synthetic resin, or may be formed using a metallic material such as stainless steel (STS) or titanium (Ti).

On the front surface of the body, may be disposed a display 210, a first audio output unit 211, a user input unit 218, and a front camera 216.

The display 210 includes a liquid crystal display (LCD) module, organic light emitting diodes (OLED), e-paper, or the like, where each can be used for visually displaying information. The display 210 may include a touch sensing means for inputting information in a touch manner. Hereinafter, the display 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2A, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, obtained by an image sensor in a video call mode or a capturing mode. The processed image frames may be displayed on the display 210.

The image frames processed by the front camera 216 may be stored in the memory 160, or may be transmitted to the outside through the wireless communication unit 110. The front camera 216 may be implemented in two or more according to a user's interface.

The user input unit 218 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 218 may be implemented as a dome switch, or a touch screen, or a touch pad for inputting commands or information in a user's push or touch manner. Alternatively, the user input unit 218 may be implemented, for example, as a wheel for rotating a key, a jog, or a joystick. The user input unit 218 is configured to input various commands such as START, END and SCROLL.

A side key 214, an interface unit (not shown), an audio input unit 213, etc. are disposed on the side surface of the rear case 202.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 221, controlling the level of sound output from the audio output unit 211, and converting a current mode of the display 210 into a touch recognition mode.

The audio output unit 213 may be implemented as a microphone for receiving a user's voice, other sound, etc.

The interface unit (not shown) serves a path through which the mobile terminal 200 performs data exchange, etc. with an external device. For example, the interface unit (not shown) may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit (not shown) may be a card socket for accommodating an external card such as a subscriber identification module (SIM) card, a user identity module (UIM) card or a memory card for storing information.

A broadcast signal receiving antenna as well as an antenna for calling may be additionally disposed at the terminal body. For instance, an antenna for receiving terrestrial DMB signals may be implemented as a monopole antenna configured to be withdrawn from the terminal body.

A power supply unit 240 and a rear camera 221 are disposed on the rear surface of the terminal body.

The power supply unit 240 is configured to supply power to the mobile terminal 200. The power supply unit 240 may be mounted in the body, or may be detachably mounted to the body.

A flash 223 is disposed close to the rear camera 221. When capturing an object by using the rear camera 221, the flash 223 provides light onto the object.

A mirror 224 may be disposed close to the flash 223. When a user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the body so as to rotate or pop-up.

Figure 3:
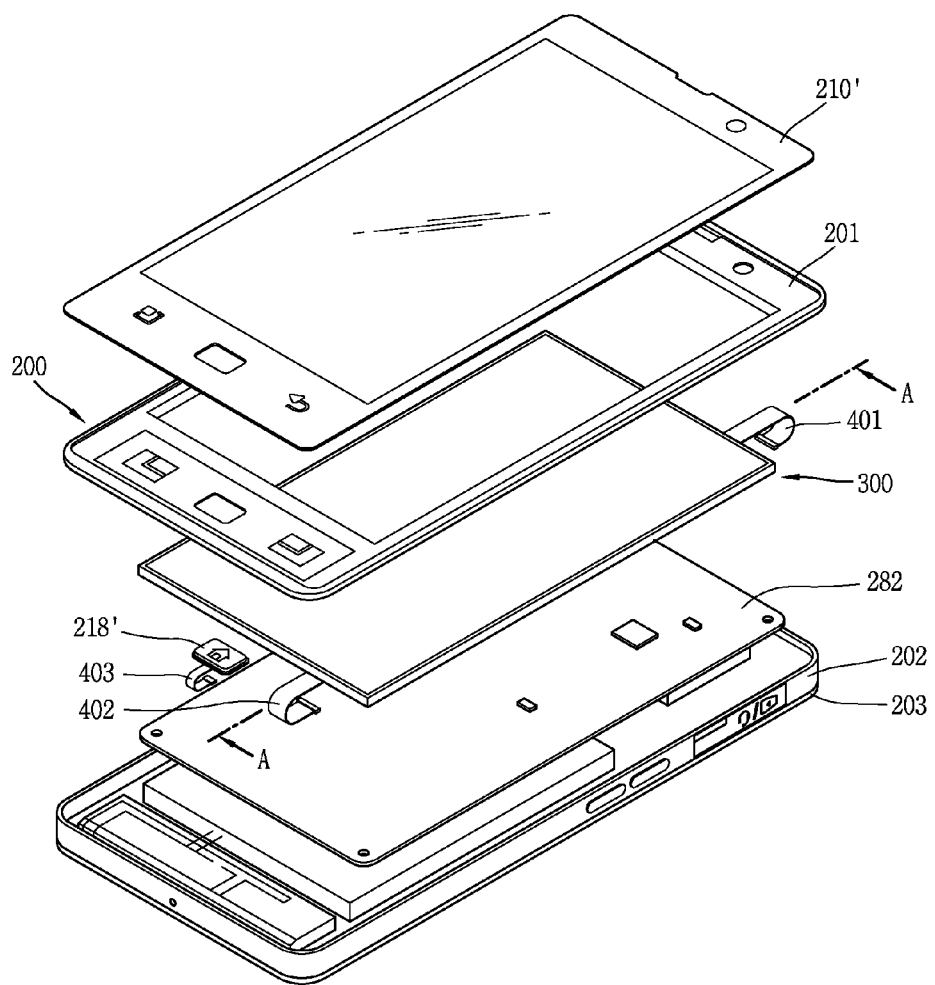
FIG. 3 is an exploded perspective view of the mobile terminal shown in FIG. 2A.
Figure 4A:
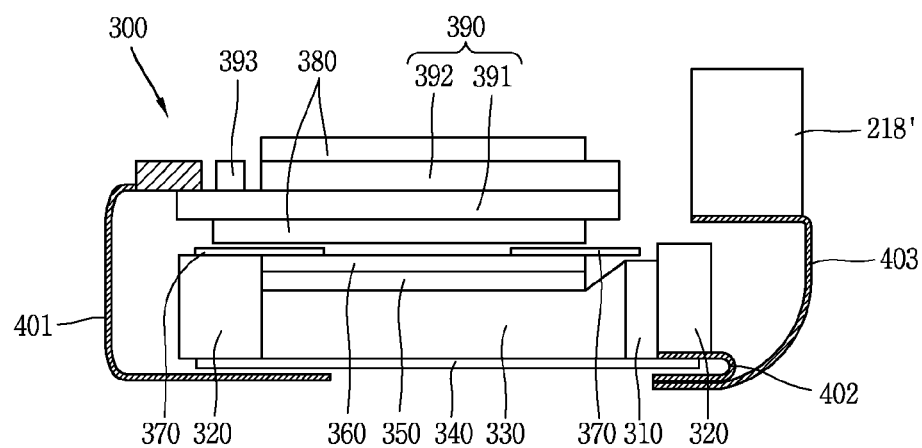
FIGS. 4A to 4C are sectional views taken along line 'A-A' in FIG. 3, according to various embodiments of the present invention.

FIG. 3 is an exploded perspective view of the mobile terminal shown in FIG. 2A, and FIG. 4A is a sectional view taken along line 'A-A' in FIG. 3 according to an embodiment of the present invention.

Referring to FIGS. 2A, 3 and 4A, the mobile terminal 200 includes a window 210' which constitutes the display by being coupled to one surface of the front case 201, and a display unit 300 disposed between the front case 201 and the rear case 202.

A main circuit board 282 is disposed between the front case 201 and the rear case 202. The main circuit board 282 may be configured as an example of the controller 180 (refer to FIG. 1) for operating various types of functions of the mobile terminal 200. The main circuit board 282 is electrically connected to various types of electronic components, to thus process input signals.

A touch sensor (not shown) may be mounted to the window 210'. The touch sensor is configured to sense a touch input, and is formed to be light-transmissive. The touch sensor may be mounted to the front surface of the window 210', and may be configured to convert a change of a voltage applied onto a specific part of the window 210', into an electric input signal.

An input key 218' of the user input unit 281 is provided in the terminal body. Since at least one region of the input key 218' is exposed to the outside of the terminal body, signals are input to the input key 218' in a pressing manner.

The display unit 300 is mounted to the rear surface of the window 210'. The display unit 300 of the present invention may be implemented as a liquid crystal display (LCD). The display unit 300 displays images using an LC panel and a backlight unit. Here, the LC panel includes LC molecules of which alignment changes by a power, and the backlight unit is configured to provide light to the LC molecules.

As the display unit 300 is driven, heat may be generated. In the present invention, for dispersion of heat generated from the display unit 300, a driver integrated circuit of the display unit 300 is spaced from a light source portion of the backlight unit.

For a minimized width of the front case 201 for fixing the display unit, the input key 218' is disposed to partially overlap the display unit 300.

Hereinafter, a detailed structure of the display unit 300, and an arrangement relation between the display unit 300 and the input key 218' will be explained.

Referring to FIG. 4A, the display unit 300 includes an LC panel 390 and a backlight unit.

The LC panel 390 forms images by receiving electric signals. The LC panel 390 is formed in a plate shape, and is disposed to face the front surface of the terminal body.

The LC panel 390 includes a thin film transistor (TFT) substrate 391, a color filter substrate 392, and LC molecules (not shown) injected between the TFT substrate 391 and the color filter substrate 392.

The TFT substrate 391 includes a plurality of gate lines and a plurality of data lines implemented in the form of matrices. Thin film transistors (TFT) are formed at crossing points of the gate lines and the data lines.

A driver integrated circuit (driver IC) 393 is formed at the TFT substrate 391. The driver IC 393 may be formed close to a first edge of the LC panel 390. Referring to FIG. 2A, the first edge may be a region close to an upper end of the mobile terminal.

The driver IC 393 transmits a signal voltage to the TFT substrate 391. The signal voltage is applied, through the TFT, to a common electrode disposed between a pixel electrode and the color filter substrate 392. Liquid crystal molecules are aligned between the pixel electrode and the common electrode according to the signal voltage, thereby controlling light transmittance.

The color filter substrate 392 includes a color filter and a common electrode, the color filter having red, green and blue (RGB) filters repeatedly formed in a state where black matrices are disposed therebetween. The common electrode is formed of a transparent conductive material such as Indium Tin Oxide (ITO) or Indium Zinc Oxide (IZO). The color filter substrate 392 may be formed to have an area smaller than that of the TFT substrate 391.

A pair of polarizers 380 may be arranged on upper and lower surfaces of the LC panel 390. The polarizers 380 are arranged to cross each other. The polarizer disposed under the LC panel 390 serves to polarize light incident onto the LC panel 390, and the polarizer 380 formed on the LC panel 390 serves as an analyzer.

The LC panel 390 includes a display region for displaying an image through the LC molecules (not shown), and a peripheral region formed to enclose the display region. The driver integrated circuit 393 may be provided with a terminal for electrical connection. And, the driver integrated circuit 393 may be mounted on the TFT substrate 391 to thus be connected to the ends of the gate lines and the data lines extending towards the peripheral region from the display region.

A backlight unit is disposed below the LC panel 390. The backlight unit includes a light source portion 310, a light guiding portion 330, a diffusion sheet 350, a reflection sheet 340, a prism sheet 360, and a mold portion 320 for supporting the respective components.

The mold portion 320 is formed along the edges of the LC panel 390, in a quadrangular shape. The mold portion 320 supports the backlight unit so that the backlight unit can be spaced from the LC panel 390.

The light guiding portion 330 is arranged behind the LC panel 390, and is configured to uniformly induce light supplied from the light source portion 310 towards the LC panel 390.

A plurality of light emitting devices of the light source portion 310 may be disposed at one side of the light guiding portion 330. The light guiding portion 330 includes an inclination portion close to the light emitting devices, and having an inclined upper surface. Light incident onto the light guiding portion 330 from the light source portion 310, is reflected by the inclined upper surface to thus be introduced into the light guiding portion 330. This can prevent leakage of light.

The light source portion 310 includes at least one light emitting device. The light source portion 310 supplies light towards the light guiding portion 330. The light source portion 310 may include a cold cathode fluorescent lamp (CCFL), a heat cathode fluorescent lamp (HCFL), an external electrode fluorescent lamp (EEFL), a light emitting diode (LED), etc.

The light source portion 310 may be formed to be close to a second edge spaced from the first edge of the LC panel 390. The second edge is a region opposite to the first edge. In FIG. 2, the second edge may be a region close to a lower end of the mobile terminal 200.

That is, the driver integrated circuit 393 and the light source portion 310 may be spaced from each other, in a lengthwise direction of the mobile terminal. Since the driver integrated circuit 393 for emitting heat is spaced from the light source portion 310, heat generated from the mobile terminal 200 can be dispersed. This can lower a user's heat feeling during a call.

Generally, electronic components from which heat is generated are disposed at an upper end of the mobile terminal 200. However, in the present invention, the electronic components are disposed at a lower end of the mobile terminal. Under such configuration, the amount of heat generated from the upper end of the mobile terminal can be reduced. This can lower a user's heat feeling during a call.

The reflection sheet 340 is disposed below the light source portion 310 and the light guiding portion 330, and reflects light emitted from the light source portion 310 towards the light guiding portion 330.

The diffusion sheet 350 diffuses light provided from the light source portion 310, thereby providing the diffused light to the LC panel 390. And, the diffusion sheet 350 may include a base plate, and a coating layer formed on the base plate in the form of beads.

The prism sheet 360 is formed as a plurality of micro-prisms, each having a triangular pillar shape where the micro-prisms are arranged on an upper surface of the prism sheet 360. The prism sheet 360 serves to collect light diffused by the diffusion sheet 350, to a direction perpendicular to a plane of the LC panel 390. Generally, the prism sheet 360 is used in two, and the micro prisms of the prism sheet 360 have a prescribed angle therebetween. Light having passed through the prism sheet 360 proceeds in a direction perpendicular to the LC panel 390, to thus be distributed in the same brightness.

Although not shown, a protection sheet for protecting the prism sheet 360 may be formed above the prism sheet 360.

An adhesion member 370 is formed between the LC panel 390 and the backlight unit, thereby attaching the LC panel 390 and the backlight unit to each other. The adhesion member 370 may be formed to correspond to the peripheral region of the LC panel 390.

First and second flexible printed circuit boards (FPCB) 401 and 402 may be formed so as to electrically connect the driver integrated circuit 393 and the light source portion 310 to each other.

The first FPCB 401 is connected to the driver integrated circuit 393, to thus enclose the first edge. Although not shown, a supporting frame for supporting the display unit 300 may include openings formed to allow the first and second FPCBs 401 and 402 to pass therethrough.

The input key 218' is arranged close to the second edge of the LC panel 390. That is, the input key 218' is formed to be close to a lower end of the mobile terminal 200. The input key 218' may partially overlap the backlight unit.

More specifically, the backlight unit protrudes from the lower end of the mobile terminal 200 more than the LC panel 390, and the input key 218' is arranged to overlap the protruding backlight to thus be close to the second edge of the LC panel 390.

If the input key 218' is pressed by the mold portion 320, the mold portion 320 supports the input key 218'. Under such configuration, additional components for supporting the input key 218' are not required.

Further, since the mold portion 320 is arranged close to the LC panel 390, the front case 201 for supporting the front surface of the terminal body may have a decreased width. This can reduce the area of the front surface of the mobile terminal except for the display unit. Since the display unit of the same mobile terminal can have an increased area, a display region of the display unit can have an increased size.

A third FPCB 403 is formed so as to connect the input key 218' to the main circuit board 282. The third FPCB 403 is supported by the mold portion 320, and is formed to enclose the mold portion 320 adjacent to the second edge. Although not shown, a supporting frame for supporting the display unit 300 may include an opening formed to allow the third FPCB 403 to pass therethrough.

In the present invention, since the driver integrated circuit 393 of the display panel 300 configured to generate heat when being driven, is spaced from the light source portion 310 in a lengthwise direction of the mobile terminal, heat generated from the mobile terminal can be dispersed. This can lower a user's heat feeling during a call.

Further, since the input key 218' is arranged to partially overlap the backlight unit, a protruding area of the input key 218' from the display panel 300 can be reduced. This can reduce the size of the front surface of the mobile terminal except for the display unit.

Hereinafter, will be explained a mobile terminal according to another embodiment, in which the input key 218' is supported with a greater force.

Figure 4B:
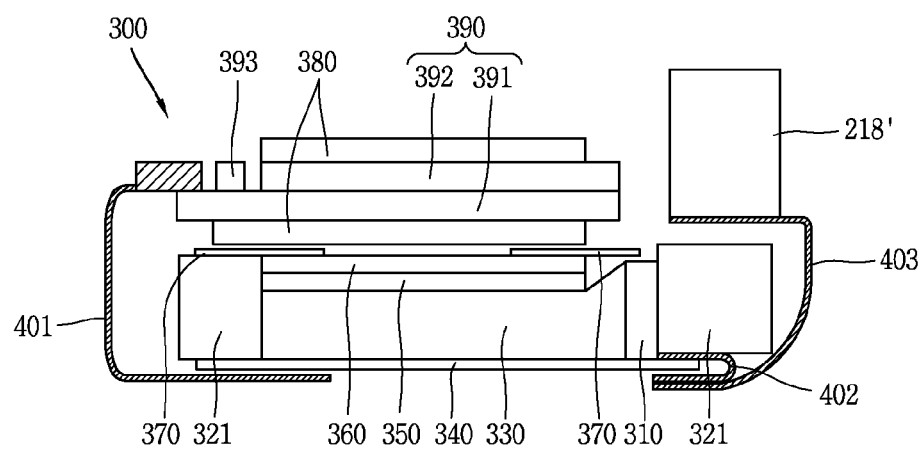

FIG. 4B is a sectional view taken along line 'A-A' in FIG. 3 according to another embodiment of the present invention.

Referring to FIG. 4B, the display panel 300 includes a backlight unit and an LC panel 390. And, the input key 218' is arranged to partially overlap the display panel 300. The mobile terminal of FIG. 4B includes the same components as the mobile terminal of FIG. 4A, except for the mold portion 321. The same components will be provided with the same reference numerals, and detailed explanations thereof will be omitted.

The mold portion 321 according to the present invention is formed to support the edge of the backlight unit. However, the mold portion 321 close to the second edge of the LC panel 390 may be formed to be thicker than the mold portion 321 close to the first edge.

The input key 218' may be arranged to entirely overlap the mold portion 321. That is, the input key 218' and the third FPCB 403 connected to the input key 218' are disposed on the mold portion 321.

Under such configuration, the input key 218' can be more stably supported by the mold portion 321. And, an impact of the display panel due to a pressure applied to the input key 218' can be attenuated.

Figure 4C:
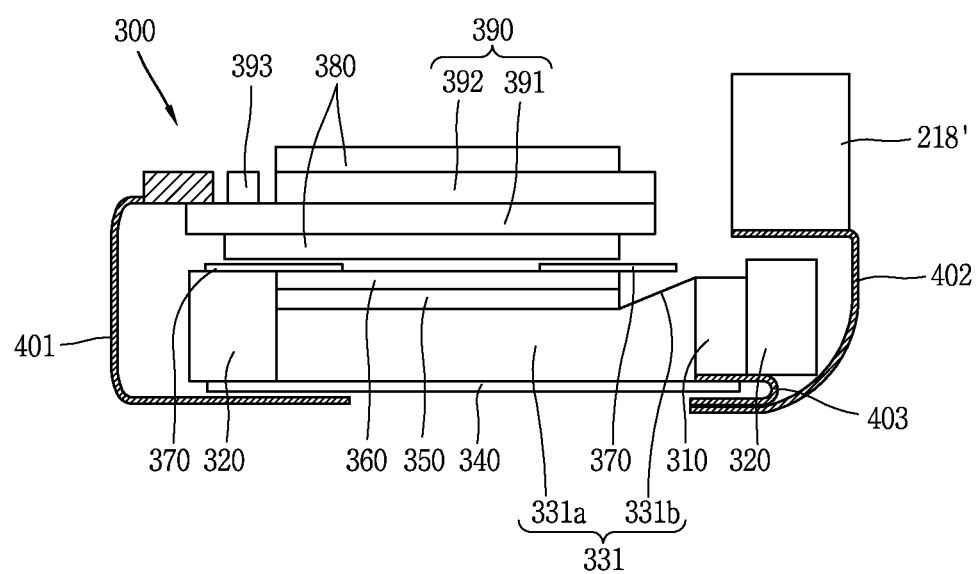

FIG. 4C is a sectional view taken along line 'A-A' in FIG. 3 according to still another embodiment of the present invention.

The display panel 300 includes a backlight unit and an LC panel 390. And, an input key 218' is arranged to partially overlap the display panel 300. The mobile terminal of FIG. 4C includes the same components as the mobile terminal of FIG. 4A, except for arrangements of the light guiding portion 331, the mold portion 320, and the input key 218'. The same components will be provided with the same reference numerals, and detailed explanations thereof will be omitted.

The light guiding portion 331 includes a first region 331a formed in a plate shape, and disposed below the LC panel 390; and a second region 331b disposed between the first region 331a and the light source portion 310, and integrally formed with the first region 331a.

One surface of the second region 331b is configured as an inclined surface. Due to the inclined surface, light emitted from the light source portion 310 is reflected to be transmitted to the first region 331a.

In the embodiment of the present invention, the input key 218' may be arranged to partially overlap the mold portion 320 and the light source portion 310. Under such configuration, the light guiding portion 331 may have an enlarged area. Especially, since the second region 331b of the light guiding portion 331 has a large area, the inclined surface may have a gradual gradient.

The input key 218' may be more stably supported by the mold portion 320 and the light source portion 310. Since the light guiding portion 331, especially, the second region 331b having the inclined surface has an increased length, a reflected amount of light into the light guiding portion increases. This can also reduce a phenomenon that light passes through the light guiding portion 331.

Under such configuration, a loss amount of light is reduced, resulting in enhancing the efficiency of the display unit, and reducing the number of light emitting devices of the light source portion.

Figure 5A:
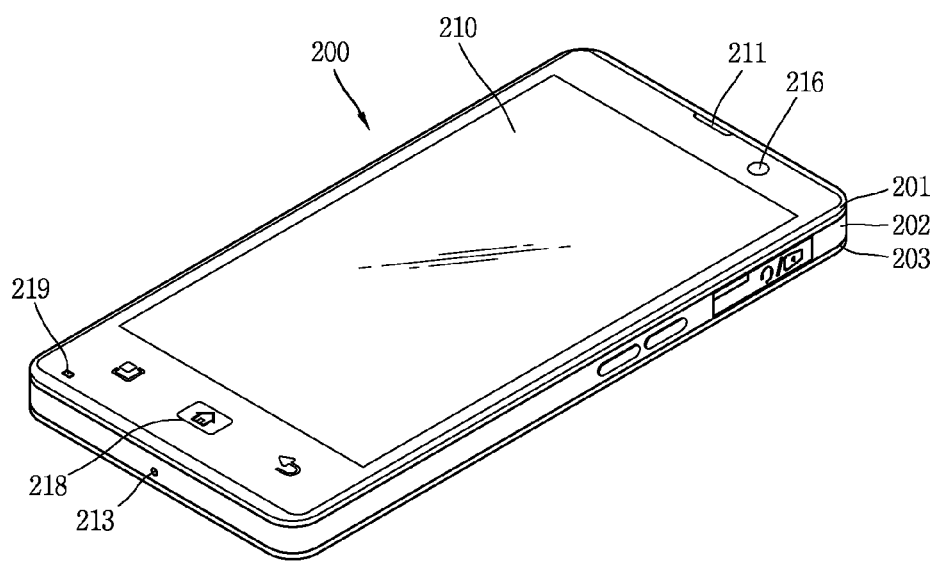
FIG. 5A is a front perspective view of a mobile terminal according to another embodiment of the present invention.
Figure 5B:
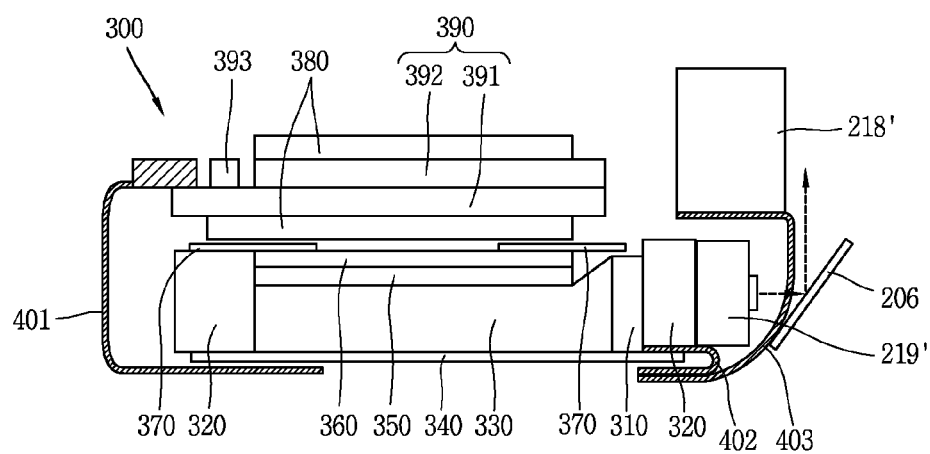
FIG. 5B is a sectional view for explaining a coupled state among a display unit, a signal input key and a second front camera of FIG. 5A.

FIG. 5A is a front perspective view of a mobile terminal according to another embodiment of the present invention, and FIG. 5B is a sectional view for explaining a coupled state among a display unit, a signal input key and a second front camera of FIG. 5A.

The mobile terminal 200 of FIG. 5A includes a front case 201, a rear case 202, a battery cover 203, a display unit 210, a user input unit 218, a sound output portion 211, a sound input portion 213, a first front camera 216, and a second camera 219. Here, the front case 201, the rear case 202 and the battery cover 203 form the appearance of the mobile terminal 200. The mobile terminal 200 of FIG. 5A may be provided with the same components as the mobile terminal of FIGS. 2A and 4A, except for the second front camera 219, a camera module 219' of the second front camera 219, and a reflection portion 206. The same components will be provided with the same reference numerals, and details explanations thereof will be omitted.

Referring to FIGS. 5A and 5B, the second front camera 219 may be disposed close to the user input unit 218, below the display unit 210. The second front camera 219 includes a camera module 219' and a reflection portion 206 each disposed below the input key 219'.

The camera module 219' is disposed close to the mold portion 320, and a camera lens of the camera module 219' is disposed towards a lower side surface of the mobile terminal 200.

Although not shown, at the front case 201, may be formed a hole through which light can be incident to the camera module 219' from the outside. The reflection portion 206 is disposed so that light can be directed towards the camera lens. That is, light incident onto the front surface of the mobile terminal 200 is reflected by the reflection portion 206, to thus be incident onto the camera lens which is towards the side surface of the mobile terminal 200.

In the embodiment, the camera 219 is additionally arranged at the space between the input key 218' and the display unit. This can enhance the function of the mobile terminal. Further, the input key 218' can be more stably supported by the camera module 219'.

Figure 6:
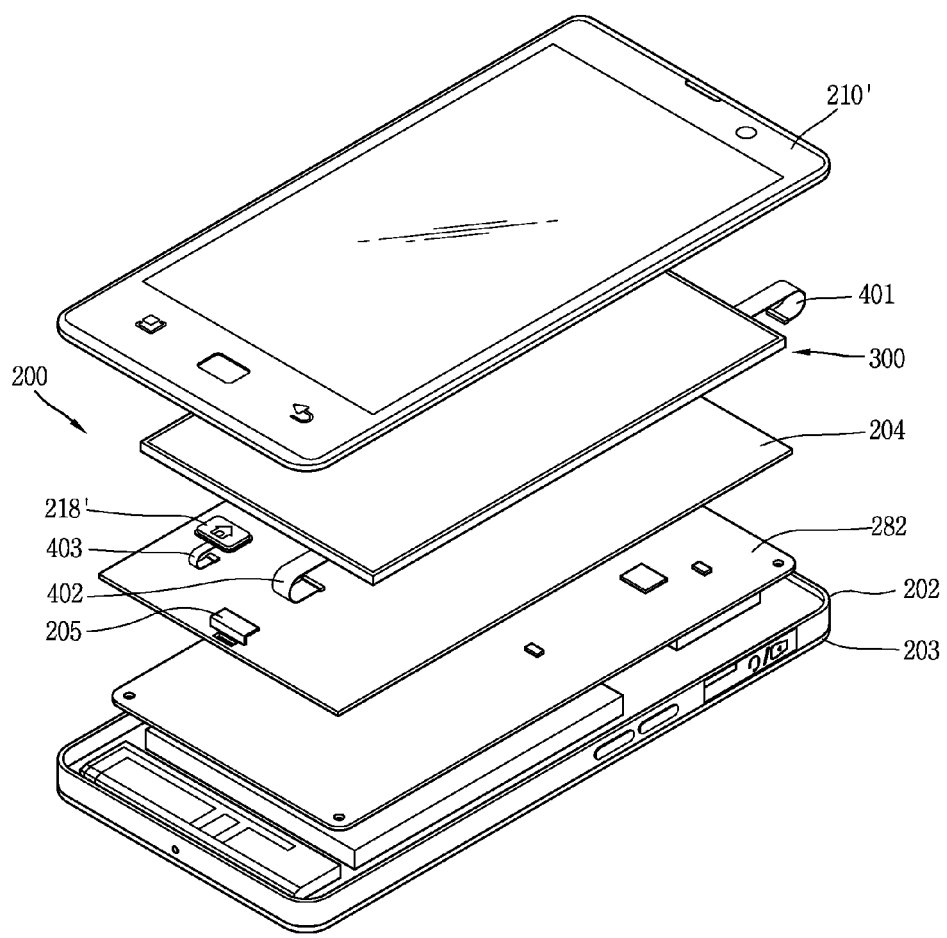
FIG. 6 is an exploded perspective view of the mobile terminal shown in FIG. 2A according to still another embodiment of the present invention.
Figure 7:
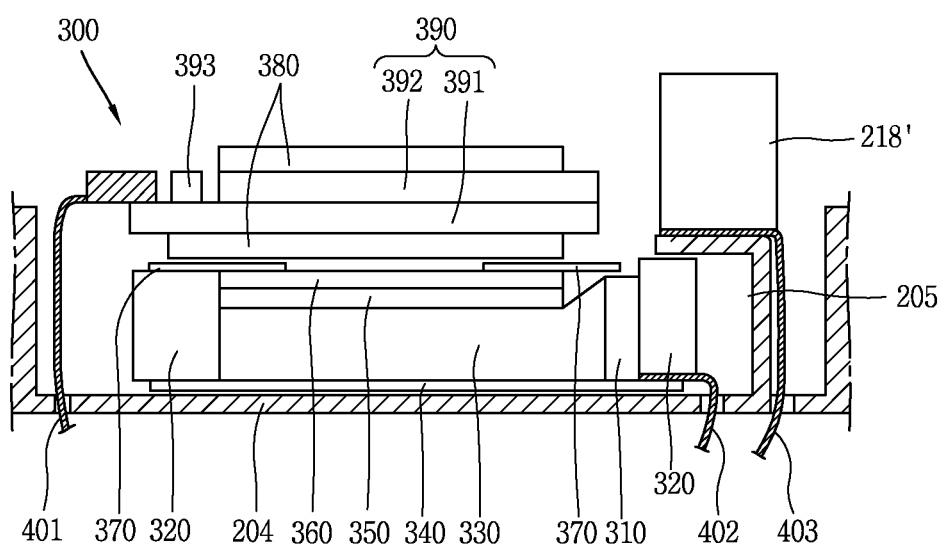
FIG. 7 is a sectional view of a display unit and a signal input key of FIG. 6.

FIG. 6 is an exploded perspective view of the mobile terminal shown in FIG. 2A according to still another embodiment of the present invention, and FIG. 7 is a sectional view of a display unit and a signal input key of FIG. 6.

The mobile terminal of FIGS. 6 and 7 includes a display module 300, a main circuit board 282, an input key 218' and a frame 204. The mobile terminal 200 of FIGS. 6 and 7 may include the same components as the mobile terminal of FIGS. 3 and 4A, except for the frame 204. The same components will be provided with the same reference numerals, and detailed explanations thereof will be omitted.

Referring to FIGS. 6 and 7, the display unit 300 is supported by the frame 204 disposed in the terminal body. The main circuit board 282 is disposed below the frame 204.

The frame 204 may be provided with openings through which the first to third FPCBs 401, 402 and 403 are connected to the main circuit board 282.

The frame 204 may be provided with a supporting portion 205 bent after protruding from one surface of the frame 204, which supports the display unit 300. The supporting portion 205 supports the input key 218' and the third FPCB 403 connected to the input key 218'.

The supporting portion 205 may be formed of the same material as the frame 204, and may be integrally formed with the frame 204. Alternatively, the supporting portion 205 may be welded to one surface of the frame 204 or the supporting portion 205 may be formed of an elastic material so as to support the input key 218' which moves through pressurization.

The supporting portion 205 may be formed so that the mold portion 320 of the backlight unit can be fitted thereinto. That is, a protruding height of the supporting portion 205 from the frame 204 may be equal to or larger than the height of the mold portion 320.

The input key 218' supported by the supporting portion 205 may be disposed to partially overlap the mold portion 320. This can reduce the width of the mobile terminal except for the display unit 210.

The input key 218' can be more stably supported by the supporting portion 205, and the damage of the display unit 300 due to pressurization of the input key 218' can be minimized.

Since the supporting portion 205 supports one side surface of the display unit 300, the display unit 300 and the input key 218' can be more stably arranged. This can enhance the endurance of the mobile terminal.

In the present invention, the light source portion of the display unit is spaced from the driver integrated circuit, so that heat emitted from the display unit can be dispersed. This can reduce a user's heat feeling during a call.

Further, since the display unit and the input key are disposed to overlap each other, the size of the mobile terminal except for the display unit can be reduced. As a result, a bezel portion of the mobile terminal can be minimized, and a display area of the display unit can be increased.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body;
   a display unit for outputting an image to a first surface of the terminal body, the display unit including:
      a liquid crystal (LC) panel configured to form the image by receiving an electric signal, the LC panel being disposed to face the first surface of the terminal body;
      a driver integrated circuit (IC) configured to apply the electric signal to the LC panel, the driver IC being mounted to a first surface of the LC panel adjacent to a first edge of the LC panel; and
      a light source portion configured to provide light to the LC panel, the light source portion being disposed close to a second edge of the LC panel opposite to the first edge;
   an input key partially overlapping the display unit, the input key being configured to input signals when pressed;
   a main circuit board disposed in the terminal body, the main circuit board having at least one electronic component mounted thereto;
   a first flexible printed circuit board (FPCB) configured to connect the driver IC to the main circuit board, the first FPCB extending from the LC panel so as to enclose the first edge of the LC panel; and
   a second FPCB configured to connect the light source portion to the main circuit board, the second FPCB extending from the light source portion so as to enclose the second edge of the LC panel.

2. The mobile terminal of claim 1, wherein the input key is disposed close to the second edge of the LC panel.

3. The mobile terminal of claim 1, wherein the display unit further includes:
   a light guiding portion disposed close to the light source portion, the light guiding portion being arranged to overlap the LC panel, and the light guiding portion being configured to guide light emitted from the light source portion to the LC panel;
   a diffusion portion disposed between the light guiding portion and the LC panel, the diffusion portion being configured to diffuse the light guided by the light guiding portion; and
   a mold portion configured to support at least an edge of the light guiding portion and at least an edge of the diffusion portion, at least part of the mold portion being arranged below the input key to support the input key.

4. The mobile terminal of claim 3, wherein the light guiding portion includes a first portion disposed below the LC panel, a second portion disposed between the first portion and the light source portion, and the second portion having a sloped upper surface.

5. The mobile terminal of claim 1, further comprising a third FPCB configured to connect the input key to the main circuit board, the third FPCB being supported by the mold portion.

6. The mobile terminal of claim 1, further comprising a frame disposed in the terminal body to support the display unit, the frame including first and second openings through which the first and second FPCBs pass, respectively.

7. The mobile terminal of claim 6, further comprising a bent supporting portion that protrudes from the frame to support a lower part of the input key.

8. The mobile terminal of claim 7, wherein the mold portion is disposed between the frame and the supporting portion.

9. The mobile terminal of claim 7, further comprising a third FPCB configured to connect the input key to the main circuit board, the third FPCB being supported by the supporting portion,
   wherein the frame includes a third opening through which the third FPCB passes.

10. The mobile terminal of claim 1, further comprising a light guiding portion disposed close to the light source portion, the light guiding portion being arranged to overlap the LC panel, and the light guiding portion being configured to guide light emitted from the light source portion to the LC panel,
    wherein the input key is disposed so as to be supported by a region of the light guiding portion.

11. The mobile terminal of claim 1, further comprising a camera module arranged at the one surface of the terminal body so as to be close to the input key.

12. The mobile terminal of claim 11, wherein the camera portion includes a camera module disposed close to the light source portion such that the camera module partially overlaps the input key, the camera module being configured to support the input key.

13. The mobile terminal of claim 12, wherein the one surface of the terminal body is a front surface,
    wherein the terminal body further includes a rear surface facing the front surface and a side surface which connects the front surface to the rear surface, and
    wherein the camera module is mounted to one of the front surface of the terminal body and the side surface of the terminal body.

14. The mobile terminal of claim 13, wherein the camera module includes a camera lens that faces towards the side surface of the terminal body.

15. The mobile terminal of claim 14, wherein, when the camera module is mounted to the front surface, the mobile terminal further includes:
   a camera hole configured to pass light therethrough so as to be incident on the camera module from the outside; and
   a reflection portion configured to reflect the light passing through the camera hole to the camera lens.

16. The mobile terminal of claim 11, wherein the input key partially overlaps the camera module so as to be supported by the camera module.

17. A mobile terminal comprising:
   a terminal body;
   a display unit for outputting an image to a first surface of the terminal body, the display unit including:
      a liquid crystal (LC) panel configured to form the image by receiving an electric signal, the LC panel being disposed to face the first surface of the terminal body;
      a driver integrated circuit (IC) configured to apply the electric signal to the LC panel, the driver IC being mounted to a first surface of the LC panel adjacent to a first edge of the LC panel; and
      a light source portion configured to provide light to the LC panel, the light source portion being disposed close to a second edge of the LC panel opposite to the first edge;
   a main circuit board disposed in the terminal body, the main circuit board having at least one electronic component mounted thereto;
   a first flexible printed circuit board (FPCB) configured to connect the driver IC to the main circuit board, the first FPCB extending from the LC panel so as to enclose the first edge of the LC panel; and
   a second FPCB configured to connect the light source portion to the main circuit board, the second FPCB extending from the light source portion so as to enclose the second edge of the LC panel.

18. A mobile terminal comprising:
   a terminal body;
   a display unit for outputting an image to a first surface of the terminal body, the display unit including:
      a liquid crystal (LC) panel configured to form the image by receiving an electric signal, the LC panel being disposed to face the first surface of the terminal body;
      a driver integrated circuit (IC) configured to apply the electric signal to the LC panel, the driver IC being mounted to a first surface of the LC panel adjacent to a first edge of the LC panel; and
      a light source portion configured to provide light to the LC panel, the light source portion being disposed close to a second edge of the LC panel opposite to the first edge; and
   a camera module arranged at the one surface of the terminal body so as to be close to an input key,
   wherein the camera portion includes a camera module disposed close to the light source portion such that the camera module partially overlaps the input key, the camera module being configured to support the input key.

* * * * *